(12) United States Patent
Turck et al.

(10) Patent No.: US 6,276,702 B1
(45) Date of Patent: Aug. 21, 2001

(54) WHEEL SUSPENSION ASSEMBLY

(75) Inventors: William Benjamin Turck, Taylor; Ingo Klug, Dearborn Heights; Manfred Carl Rumpel, Bloomfield Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/370,160

(22) Filed: Aug. 9, 1999

(51) Int. Cl.⁷ .................................. B62D 7/18; B62D 7/22
(52) U.S. Cl. ...................... 280/93.511; 403/122; 403/220
(58) Field of Search ........................... 280/93.511, 93.51, 280/93.512; 403/122, 220, 291, 132, 133, 134, 135

(56) References Cited

U.S. PATENT DOCUMENTS

| | | | |
|---|---|---|---|
| 2,778,664 | * | 1/1957 | Herbenar ............................ 403/220 |
| 2,878,047 | * | 3/1959 | Booth ............................. 280/93.511 |
| 3,037,787 | * | 6/1962 | Gottschald ........................ 403/133 |
| 3,135,540 | * | 6/1964 | Herbenar ........................ 280/93.511 |
| 3,210,108 | * | 10/1965 | Herbenar ........................ 280/93.511 |
| 3,222,083 | | 12/1965 | Stotz et al. . |
| 3,240,509 | * | 3/1966 | Pierce ................................ 403/134 |
| 3,337,246 | * | 8/1967 | Moskovitz ........................ 403/133 |
| 3,343,857 | * | 9/1967 | Cislo ................................. 403/132 |
| 4,943,082 | | 7/1990 | Kijima et al. . |
| 5,022,673 | | 6/1991 | Sekino et al. . |
| 5,931,597 | * | 8/1999 | Urbach .............................. 403/134 |

* cited by examiner

Primary Examiner—Lanna Mai
Assistant Examiner—Ruth Ilan
(74) Attorney, Agent, or Firm—Gregory Brown; William J. Coughlin

(57) ABSTRACT

A wheel suspension assembly 10 for use with a vehicle having a wheel 11. Assembly 10 includes a tie rod 12, a knuckle 14 having an integrally formed knuckle arm 16, and a ball joint 18 which rotatably couples the tie rod 12 to the knuckle arm 16. Tie rod 12 includes an outer end 24 having an integrally formed ball socket 26 and a pair of opposed and outwardly extending members 28, 30, which include a pair of orthogonally projecting foot members or "feet" 32, 34. Knuckle arm 16 includes an end portion 40 which is attached to a ball stud 44. Ball stud 44 is mated with socket 26 and cooperatively forms ball joint 18. End portion 40 includes a generally circular bottom surface 52 disposed in a substantially parallel relationship to "feet" 32, 34. Two resilient elements or "pads" 62, 64 are abuttingly disposed between "feet" 32, 34 and surface 52. Feet 32, 34, bumpers 62, 64, and surface 52 substantially prevent or reduce the angular movement of tie rod 12 about its longitudinal axis 74 and substantially dampen or reduce the transfer of vibrations from knuckle 14 to tie rod 12 between said ball socket 26 and said ball stud 44.

14 Claims, 3 Drawing Sheets

WHEEL SUSPENSION ASSEMBLY

FIELD OF THE INVENTION

This invention relates to a vehicle wheel suspension assembly and more particularly, to a vehicle wheel suspension assembly having a tie rod, a knuckle, and an assembly which holds the tie rod in a desired position and which dampens and/or substantially eliminates vibrations which are normally transferred from the knuckle steering arm to the tie rod.

BACKGROUND OF THE INVENTION

Vehicle wheel suspension assemblies typically include a pair of knuckles or spindles which rotatably and respectively support the front and/or rear wheels of the vehicle, and a pair of tie rods, each of which operatively connect the steering assembly of the vehicle to a respective and unique one of the knuckles or spindles. Particularly, the selective rotation of the steering assembly is transferred through the tie rods to the knuckles or the spindles, thereby selectively and desirably causing the wheels to turn or rotate, and allowing the vehicle to be selectively steered.

Each of the tie rods are usually connected to a unique and respective knuckle (or spindle) by the use of a conventional ball joint. Typically, each ball joint includes a ball socket, which is typically and integrally formed within the outer or projecting end of a unique one of the tie rods, and a ball stud which resides within and which is rotatably coupled to the ball socket and which is typically attached to a unique one of the knuckles or spindles.

These wheel suspension assemblies are typically designed to operatively provide a relatively and desirable tight or sharp vehicle turning radius. As a result, each tie rod must often be bent and this bend or curvature is made or created within the portion of the tie rod which is in relative close proximity to the ball joint, thereby substantially preventing the tie rod from contacting or otherwise interfering with the rim and/or wheel of the vehicle while the vehicle performs these relatively sharp or tight turns. These prior wheel suspension assemblies suffer from several drawbacks.

First, the tie-rod bend or curvature, necessary to provide a desirable and a relatively sharp or tight vehicle turning radius, represents a mass or a portion which is disposed off of or which is removed from the longitudinal axis or the axis of rotation of the tie rod. This offset mass causes the creation of a gravitational force or torque upon the tie rod, thereby causing the tie rod to turn and/or rotate substantially about its longitudinal axis.

In these prior wheel suspension assemblies, this rotation and/or rotational force was selectively controlled and/or was selectively absorbed by the contact of the ball stud with the opening of the ball socket, and thereby allowed the tie rod to maintain a certain desired position. This arrangement (i.e., requiring the ball joint to substantially control and/or maintain the angular position of the tie rod) caused excessive frictional wear and fatigue to and of the ball joints and results in diminished performance of the ball joint.

Furthermore, typically a rather generous or large tolerance exists within each ball joint, and particularly, exists between each engaged ball stud and ball socket opening. This generous tolerance allows and/or causes each of the tie rods to undesirably move or shift during vehicle operation, and undesirably causes vibration of the vehicle steering column, and further wear to the ball joints.

There is therefore a need to provide a vehicle wheel suspension assembly which overcomes at least some of the various and previously delineated drawbacks of prior vehicle suspension assemblies, which includes a tie rod which is substantially and precisely centered or held in a desired position; which substantially reduces the amount of ball stud to socket contact; which substantially eliminates ball joint socket to stud vibrations; and which substantially reduces undesirable stress and/or wear to the ball joints.

SUMMARY OF THE INVENTION

It is a first object of the invention to provide a vehicle wheel suspension assembly which overcomes some or all of the previously delineated drawbacks of prior vehicle wheel suspension assemblies.

It is a second object of the invention to provide a vehicle wheel suspension assembly which selectively holds a tie rod in a desired position and which allows the tie rod to maintain this desired and respective position as the vehicle is driven and steered.

It is a third object of the present invention to provide a tie rod and knuckle assembly which substantially eliminates and/or reduces the amount of vibrations which emanate from the contact of the ball joint socket and stud.

According to a first aspect of the present invention, an assembly for use with a vehicle suspension assembly of the type having a having a knuckle which includes a projecting ball stud, and a tie rod having a socket which rotatably receives the ball stud, is provided. The assembly includes at least one outwardly extending member coupled to the tie rod in relative proximity to the socket. At least one resilient member is abuttingly disposed between the knuckle and the at least one outwardly extending member, and is effective to maintain the tie rod in a certain desired position.

According to a second aspect of the present invention, a wheel suspension assembly for use with a vehicle of the type having a selectively movable wheel is provided. The assembly includes a tie rod having a ball socket and a knuckle which is rotatably coupled to the wheel and which includes a ball stud which is selectively, rotatably, and receivably mated within the ball socket; a pair of opposed members which are coupled to the tie rod, and which are respectively disposed on opposite sides of the ball socket; and at least one resilient pad member which is coupled to a surface of the knuckle and which abuttingly engages the pair of opposed members, effective to limit the amount of rotation of the tie rod.

According to a third aspect of the present invention, a method for limiting the amount of rotational movement of a tie rod which is rotatably coupled to a member by use of a ball joint, is provided. The method comprises the steps of disposing at least one outwardly projecting member upon the tie rod; forming a mating surface upon the member; providing at least one resilient element; and disposing the at least one resilient element between the outwardly projecting member and the mating surface, effective to substantially limit the rotational movement of the tie rod.

These and other objects, aspects, features, and advantages of the present invention will become apparent from a consideration of the following specification and the attached drawings.

DETAILED DESCRIPTION OF THE PREFERRED EMBODIMENT

Figure 1:
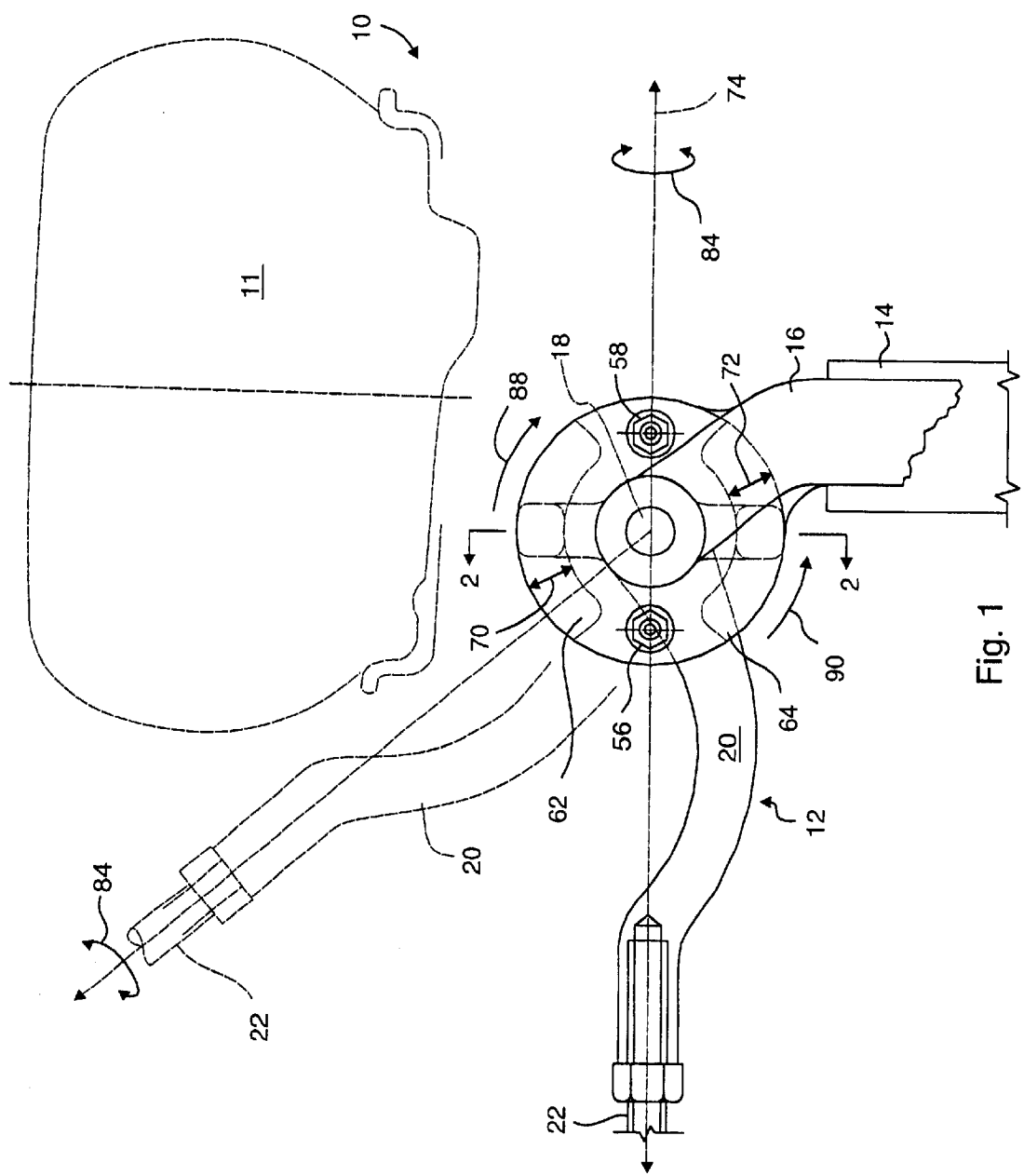
FIG. 1 is a top view of a wheel suspension assembly which is made in accordance with the teachings of the preferred embodiment of the invention.
Figure 2:
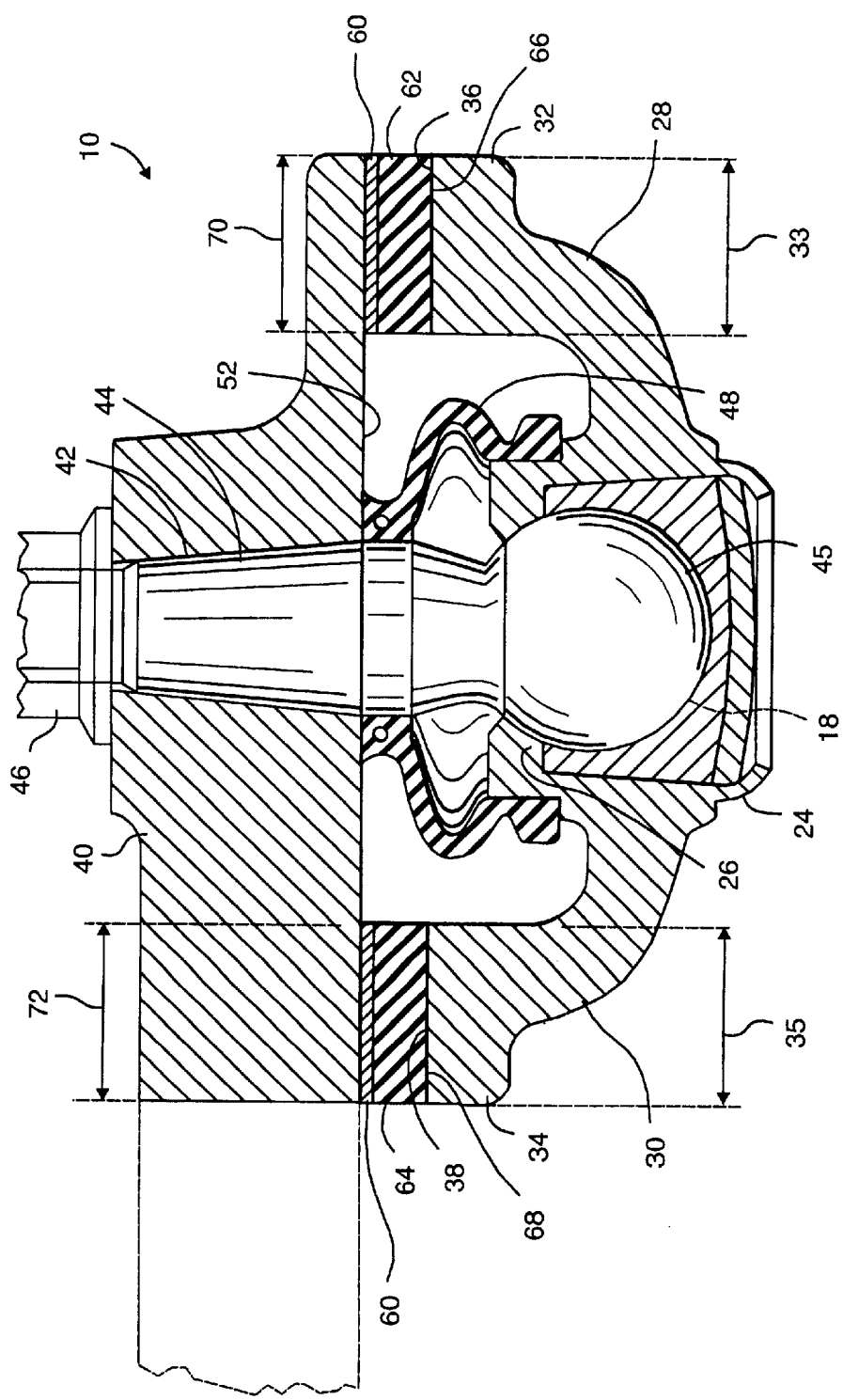
FIG. 2 is a fragmented view of the wheel suspension assembly which is shown in FIG. 1 and which is taken along view line 2—2.
Figure 3:
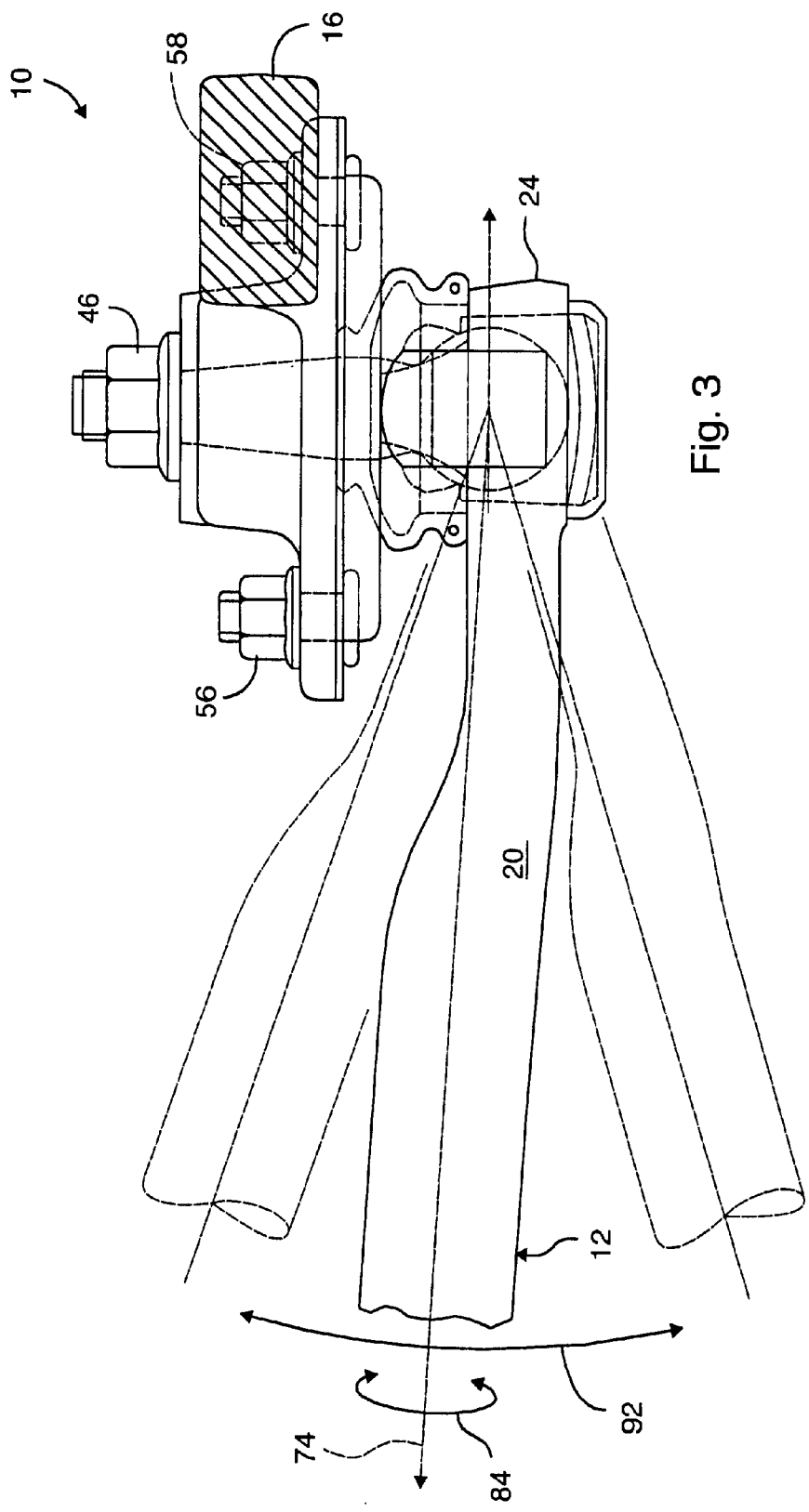
FIG. 3 is a side view of the wheel suspension assembly which is shown in FIG. 1 and taken from the front left side of the vehicle.

Referring now to FIGS. 1–3, there is shown a wheel suspension assembly 10 which is made in accordance with the teachings of the preferred embodiment of the invention and which is adapted for use on the conventional and typical left front wheel 11 of a vehicle. It should be appreciated that a substantially identical assembly 10 may be selectively used upon a right front wheel and/or upon the rear wheels of a vehicle and that the following discussion is equally applicable to the right front wheel and rear wheel suspension assemblies. Moreover, while the following discussion is directed to a knuckle, it should be realized that the assembly of the invention is equally applicable to a spindle. As shown, wheel suspension assembly 10 includes a tie rod assembly 12, a knuckle 14 having an integrally formed knuckle arm 16, and a ball joint 18 which rotatably couples tie rod assembly 12 to knuckle arm 16.

Tie rod assembly 12 includes a "bent" or "curved" arm member 20 and a conventional steering connection rod 22 which selectively connects tie rod 12 to a conventional vehicle steering assembly (not shown) and which is fixedly coupled to arm 20 in a known and conventional manner.

Arm 20 includes an outer end 24 including an integrally formed ball socket 26 and two integrally formed, opposed, and outwardly extending members 28, 30. Members 28, 30 respectively include a pair of substantially identical, integrally formed and orthogonally projecting flanges, foot members, or "feet" 32, 34, which are disposed on opposite sides of the ball socket 26. Each foot 32, 34 respectively includes a substantially identical, square shaped, flat, and smooth top surface 36, 38 each having a certain width 33, 35. In one non-limiting embodiment, surfaces 36, 38 are curved or spherical. In other alternate embodiments, members 28, 30 and feet 32, 34 are not integrally formed, but rather are selectively coupled to or attached to a conventional tie rod 12 in a conventional manner, such as by way of conventional fasteners, welding, sintering, or bonding.

Knuckle 14 rotatably supports vehicle wheel 11 and includes an integrally formed and outwardly extending knuckle arm 16 which includes a generally circular tie rod connecting end portion 40. Portion 40 includes a centrally disposed and generally cylindrical stud retaining aperture or hole 42 which, as best shown in FIG. 2, selectively receives a conventional ball stud 44. Ball stud 44 is secured within hole 42 by the use of a conventional and commercially available fastener 46 and includes a substantially spherical ball end 45 which rotatably mates with ball socket 26, thereby cooperatively forming ball joint 18. Ball joint 18 further includes a conventional seal 48 which is attached to ball socket 26 and which substantially and sealingly prevents moisture, dust, and/or other undesirable particles from entering into ball joint 18.

End portion 40 further includes a generally circular, substantially smooth and flat integrally formed bottom surface 52. Particularly, bottom surface 52 is disposed in a substantially parallel relationship to top surfaces 36, 38 of feet 32, 34. A generally flat and circular plate member 60 abuts bottom surface 52 and is fixedly attached to bottom surface 52 by use of a pair of opposed conventional fasteners 56, 58. As shown, plate member 60 includes a pair of substantially identical and generally "C"-shaped resilient elements, "bumpers", or "pads" 62, 64 which are fixedly secured to plate member 60, such as by use of a conventional and commercially available adhesive. In the preferred embodiment of the invention, pads 62, 64 are manufactured from a resilient and durable material, such as polyeurothane, teflon, rubber, or any other suitable conventional and commercially available material. Each pad 62, 64 has a generally smooth bottom or "foot" contacting surface 66, 68 which respectively, selectively, pressingly, and slidably abuts the top surfaces 36, 38 of members 32, 34. Moreover, pads 62, 64 have substantially identical widths 70, 72 which are substantially identical to widths 33, 35 of feet 36, 38. In one non-limiting embodiment, pads 62, 64 are attached directly to surface 52 in a known and conventional manner. In other alternate embodiments, pads 62, 64 are coupled to opposed feet 32, 34 and are adapted to abuttingly and slidingly engage with surface 52.

In operation, the movement of the steering assembly is transferred from tie rod 12 to knuckle 14 through ball joint 18. Movement of tie rod 12 causes knuckle 14 to pivot, thereby turning or steering the wheel of the vehicle. As best shown in FIG. 1, as knuckle 14 pivots, the smooth top surfaces 36, 38 of feet 32, 34 matingly and pressingly slide along the smooth bottom surface 66, 68 of pads 62, 64 in the directions shown by arrows 88, 90. In the preferred embodiment of the invention, pads 62, 64 are sized and/or adapted to continuously contact feet 32, 34 over the full range of pivotal movement of tie rod 12. As best shown in FIG. 3, as wheel 11 moves up and down due to changes in the road surface upon which wheel 11 travels, tie rod 12 further pivots in the directions illustrated by arrow 92. While knuckle 14 is able to freely pivot in the directions illustrated by arrows 88–92 during operation of the wheel suspension assembly, the angular position of tie rod 12 in respect to its longitudinal axis 74 remains substantially constant. Specifically, the continuous mating contact between feet 32, 34 and pads 62, 64 holds tie rod 12 in a desired angular position and substantially prevents tie rod 12 from rotating about its longitudinal axis 74 in either of the directions indicated by arrows 84. Particularly, as torque and rotational forces are imparted upon tie rod 12 and curved arm 20, the contact between feet 32, 34 and pads 62, 64 substantially prevent the longitudinal angular or rotational movement of the tie rod 12 and arm 20. Furthermore, because pads 62, 64 absorb most of the force and stress caused by the torque and rotational force caused by curved arm 20 and the movement and vibration of knuckle 14, the force imparted upon the ball joint by prior wheel suspension assemblies is substantially reduced or eliminated in the present invention. Moreover, the resilient pads 62, 64 dampen the transfer of vibrations between socket 26 and ball stud 44, thereby further preventing wear to the ball joint. In this manner, it should be appreciated that wheel suspension assembly 10 maintains a substantially precise and constant angular position for tie rod 12, substantially dampens or eliminates the transfer of vibrations from the ball joint socket 26 to ball stud 44 and substantially prevents the deterioration of the ball joint.

It is understood that the invention is not limited by the exact construction or method illustrated and described above but that various changes and/or modifications may be made without departing from the spirit and/or the scope of Applicant's inventions. For example and without limitation, in a rear suspension application, where there is little or no steering, surface 52 and plate 60 can be reduced in size; and the contact surfaces 36 and 38, on feet 32 and 34, can be relocated closer to the center of oscillation of ball end 45, thereby reducing the amount of sliding between surfaces 36,

38 and pads 62, 64. Moreover, while a knuckle arrangement has been shown, it should be appreciated that the foregoing invention is equally applicable to a spindle arrangement.

What is claimed is:

1. A wheel suspension assembly comprising:

a knuckle which is coupled to a wheel;

a ball stud which projects from said knuckle;

a tie rod having a longitudinal axis and a ball joint socket which rotatably receives said ball stud;

at least one member which is coupled to and which outwardly extends from said tie rod; and at least one resilient member which is disposed between said knuckle and said at least one member, effective to limit rotational movement of said tie rod about said longitudinal axis.

2. The assembly of claim 1 wherein said knuckle comprises a generally flat mating surface.

3. The assembly of claim 1 wherein said at least one resilient element comprises a polyeurothane bumper.

4. The assembly of claim 1 wherein said at least one resilient element is generally "C"-shaped.

5. The assembly of claim 2 wherein said mating surface is generally circularly shaped.

6. The assembly of claim 1 wherein said at least one resilient element is further effective to substantially reduce vibrations emanating from said ball joint.

7. The assembly of claim 2 wherein said resilient element is coupled to said mating surface.

8. A wheel suspension assembly for use with a vehicle of the type having a selectively movable wheel, said assembly comprising:

a tie rod having a ball socket and a knuckle which is rotatably coupled to said wheel and which includes a ball stud which is selectively, rotatably, and receivably mated within said ball socket;

a pair of opposed members which are coupled to said tie rod, which are respectively disposed on opposite sides of said ball socket, and which each include a top surface;

a generally flat bottom surface extending from said knuckle; and at least one resilient pad member which is coupled to said bottom surface and which abuttingly engages said top surface, effective to limit the amount of rotation of said tie rod.

9. The wheel suspension assembly of claim 8 wherein said at least one resilient pad member is further effective to substantially dampen vibrations emanating from said ball socket and said ball stud.

10. The wheel suspension assembly of claim 8 wherein said at least one resilient pad member comprises a polyeurothane pad.

11. The wheel suspension assembly of claim 8 wherein said top surfaces are substantially flat.

12. A method for making an assembly that limits the amount of rotational movement of a tie rod, said tie rod having a longitudinal axis and being moveably coupled to a wheel supporting member by a ball joint assembly, said method comprising the steps of:

disposing at least one outwardly projecting member upon said tie rod;

forming a mating surface upon said wheel supporting member;

providing at least one resilient element; and disposing said at least one resilient element between said outwardly projecting member and said mating surface, effective to substantially limit the rotational movement of said tie rod about said longitudinal axis.

13. The method of claim 12 further comprising the step of coupling said at least one resilient element to said mating surface.

14. The method of claim 12 further comprising the step of coupling said at least one resilient element to said outwardly projecting member.

* * * * *